H. W. COLLENDER.

Billiard-Table Cushions.

No. 5,241. Reissued Jan. 21, 1873.

Witnesses:
J. Felbel.
J. N. McIntire.

Inventor:
H. W. Collender.
By his Attorney
J. N. McIntire.

UNITED STATES PATENT OFFICE.

HUGH W. COLLENDER, OF NEW YORK, N. Y.

IMPROVEMENT IN BILLIARD-TABLE CUSHIONS.

Specification forming part of Letters Patent No. 114,410, dated May 2, 1871; reissue No. 5,241, dated January 21, 1873.

*To all whom it may concern:*

Be it known that I, HUGH W. COLLENDER, of New York city, in the county and State of New York, have invented certain new and useful Improvements in Billiard-Table Cushions; and I do hereby declare the following to be a full, clear, and exact description thereof, reference being had to the accompanying drawing making part of this specification, and in which—

Figure 1:
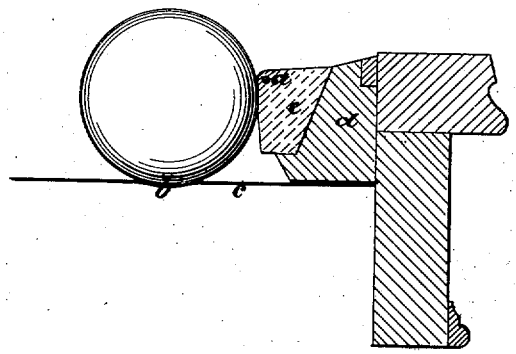
Figure 2:
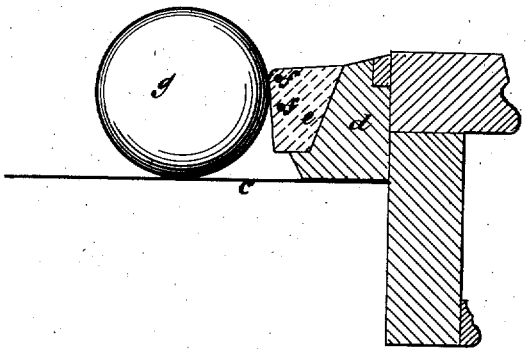

Figure 1 is a vertical section of a billiard-table cushion as heretofore made, and Fig. 2 represents a like section of a cushion on my improved plan.

India-rubber cushions have heretofore been made with a wire or cord embedded in the India rubber near the upper part of the cushions, and a short distance within the face, as represented at *a*, Fig. 1, of the accompanying drawing. The object of using a wire or cord so embedded in the India rubber is to prevent the balls, when striking, from becoming too much embedded in the cushion, and hence to increase the elastic force and the accuracy of the rebound—particularly when the balls strike the cushion with considerable force, and at an angle less than a right angle; but, in the use thus of a cord or wire, it has been found necessary to place said wire at such an elevation as to be struck by the ball at a point slightly above the axis of the latter (to prevent the jumping of the ball;) and it has been demonstrated by practice that the wire thus placed has induced to a most rapid destruction of the cloth of the bed by the increased concussions of the ball on the bed as it is wedged between the latter and the resisting wire, and the consequent formation of gutters in the cloth, as illustrated in an exaggerated form at the line *b*, Fig. 1, of the drawing; and as it is customary to continue the use of billiard-balls, even after they have been slightly reduced in diameter, to true them up, this evil increases as the use of the balls and tables is continued.

The object of my invention is to avoid the bad effect above pointed out; and, to this end, my invention consists in so making the metallic spring device, which is combined with the vulcanized India-rubber cushion, and so arranging it with the cushion-face, that the tendency to wedge the ball down onto the table-bed shall be lessened, and so that the action of the cushion, when struck, shall be about the same with various-sized balls, all as will be hereinafter more fully explained.

In carrying out the principle of my invention I propose to employ a series of wires or cords, which by preference should be of steel properly tempered, arranged one below the other in a plane about parallel with the face of the cushion, and extending its entire length, whereby the elasticity of the cushion is increased, and the too great embedding of the ball prevented, while at the same time downward-wedging tendency on small (or turned-down) balls is efficiently overcome.

In Fig. 2 of the accompanying drawing, *c* represents a part of the bed of a billiard-table; *d*, the wood part of a cushion; and *e*, the cushion, made of vulcanized India rubber. The two parallel cords *f f* I prefer to have embedded in the India rubber while it is in the green or plastic state—that is, before vulcanized. The ends of the wires or cords may be secured at the ends in any suitable manner; but I have found that without fastening the ends the India rubber holds them in place with sufficient force.

A ball, *g*, is represented in Fig. 2, and it will be seen that the two wires or cords concur in preventing it from becoming too much embedded in the cushion, and that any tendency of the upper wire or cord to wedge it down against the surface of the bed of the table is counteracted by the lower wire or cord, while at the same time the upper wire or cord effectually prevents it from hopping.

I prefer to use steel wire for this purpose, although other substances can be used; and although I prefer to have the wires or cords so far embedded as to have the India rubber extend over them, they may extend to and form part of the face of the cushion, and be covered only by the cloth; and although I have above described and represented, by preference, the use of two wires or cords, having found in practice that they will effect the desired result, yet I do not wish to be understood as limiting myself thereto, as more than two and even a continuous series of wires or cords may be employed without materially changing the character of my invention.

What I claim as my invention, and desire to secure by Letters Patent, is—

A billiard-cushion constructed to operate upon the principle and in substantially the manner described, for the purposes set forth.

HUGH W. COLLENDER. [L. S.]

Witnesses:
WM. H. RIBLET,
J. N. MCINTIRE.